(12) United States Patent
Driscoll

(10) Patent No.: US 6,275,503 B1
(45) Date of Patent: Aug. 14, 2001

(54) METHOD FOR TRANSMITTING LARGE INFORMATION PACKETS OVER NETWORKS

(75) Inventor: Kevin R. Driscoll, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/122,488

(22) Filed: Jul. 24, 1998

(51) Int. Cl.[7] .............................. H04J 3/16; H04L 12/28
(52) U.S. Cl. ...................... 370/471; 370/392; 370/349; 370/389
(58) Field of Search ...................... 370/368, 371, 370/374, 378, 379, 382, 383, 392, 394, 428, 471, 473, 474, 476, 389, 349

(56) References Cited

U.S. PATENT DOCUMENTS

| | | | |
|---|---|---|---|
| 5,307,409 | 4/1994 | Driscoll | 380/2 |
| 5,343,474 | 8/1994 | Driscoll | 370/85.3 |
| 5,377,109 | 12/1994 | Baker et al. | 364/424.06 |
| 5,386,424 | 1/1995 | Driscoll et al. | 371/36 |
| 5,440,545 | * 8/1995 | Buchholz et al. | 370/426 |
| 5,498,912 | 3/1996 | Templeman et al. | 307/115 |
| 5,606,616 | 2/1997 | Sprunk et al. | 380/29 |
| 5,644,777 | 7/1997 | Meyer et al. | 395/800 |
| 5,656,948 | 8/1997 | Sobelman et al. | 326/35 |
| 5,724,343 | 3/1998 | Pain et al. | 370/242 |
| 5,734,849 | 3/1998 | Butcher | 395/308 |
| 5,745,849 | * 4/1998 | Britton | 455/404 |
| 6,005,896 | * 12/1999 | Maruyama | 375/295 |

OTHER PUBLICATIONS

ARINC, Backplane Data Bus, ARINC Specification 659, Published: Dec. 27, 1993.

* cited by examiner

*Primary Examiner*—Wellington Chin
*Assistant Examiner*—Brenda Pham

(57) ABSTRACT

The present invention provides a method for transmitting large data messages over networks. In one embodimen☐☐t, this is accomplished by partitioning the large data message into smaller packets. The packets are transmitted over the network in reverse sequential order, from the last created packet to the first created packet. Either the transmitter or the receiver attaches the packet control information to the packets. Immediately after each packet is transmitted and received by at least one receiver, it is written into a memory pre-allocated memory location. Subsequently transmitted and received packets e written into locations adjacent previously written packets, however, they are shifted in position such that a portion of the packet overwrites the packet control information that was attached to the previously written packet. This is repeated until all of the packets have been transmitted and written and the large data message reintegrated and coherent.

7 Claims, 5 Drawing Sheets

METHOD FOR TRANSMITTING LARGE INFORMATION PACKETS OVER NETWORKS

FIELD OF THE INVENTION

The invention relates in general to a method for removing unwanted data packet header or tailer information. More specifically, the present invention relates to a method for transmitting large data messages over transmission windows that are smaller than the data message.

BACKGROUND AND RELATED ART

A revolution is occurring in the design of avionics systems for commercial air transports. The classic avionics system has a federated architecture. It consists of a set of functions, each of which is implemented in one or more Line Replaceable Units (LRUs). This federated architecture is being replaced by an integrated architecture that combines multiple functions into fewer LRUs. Integration offers many benefits, including: lower weight, lower power consumption, increased reliability, less frequent maintenance and greater flexibility. But precisely because functions share hardware resources, greater care must be taken to ensure they will operate correctly, even if co-resident functions fail. This is the engineering challenge of integrated architectures.

While prior art media access protocols have included strict time division multiple access protocols and table driven proportional access protocols, these systems have proven unsatisfactory since functions routing through the bus may conflict. Typically this has been resolved by allowing the functions to "arbitrate" their priority. However, in order to determine priority, the functions must transmit priority information, along with time window and storage memory address information, along with the actual data message. This increases the message size needed by any one function. It would be useful to have a protocol system that does not require the inclusion of additional address, time window, or priority information.

SUMMARY OF THE INVENTION

It is an object of the present invention to provide an innovative method for removing unwanted data packet header or tailer information.

It is another object of the present invention to provide a method for transmitting large data messages over time windows that are smaller than the transmitted data message. This is accomplished by partitioning the large data message into smaller packets. Packet control information is attached to the packets and they are transmitted over the transmission window in reverse sequential order, from the last created packet to the first created packet. Immediately after each packet is transmitted, it is written into a memory pre-allocated memory location. Subsequently transmitted packets are written into adjacent location, however, they are shifted in position such that they overwrite the packet control information that was attached to the previously written packet. This is repeated until all of the packets have been transmitted and written and the large data message reintegrated and coherent.

The novel features which are characteristic of the invention, both as to structure and method of operating thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

DETAILED DESCRIPTION PREFERRED EMBODIMENTS

The present invention is a protocol that increases the bandwidth transmission efficiency by improving large data message transmissions.

The method, according to the present invention, is preferably used in an Integrated Modular Avionics System that differs from a federated system in that several functions are implemented in a single integrated cabinet instead of in multiple, separate, stand-alone boxes. The volume of space occupied by the integrated cabinet typically is larger than the volume of space a single federated LRU stand-alone box occupies, but smaller that the sum of the volumes of all LRU boxes that the integrated cabinet replaces. Therefore, there is a saving in total space occupied and construction materials realized by use of the present invention.

At least one line-replaceable entity, a LRM consisting of one or more circuit cards, plugs into the integrated cabinet. Each LRM can handle multiple, independent functions. Therefore, all of the independent functions within the integrated cabinet share a common power supply, processing resources, and I/O units. To increase data availability or integrity, functions can be replicated in multiple LRMs within a single cabinet or in multiple cabinets.

Figure 1:
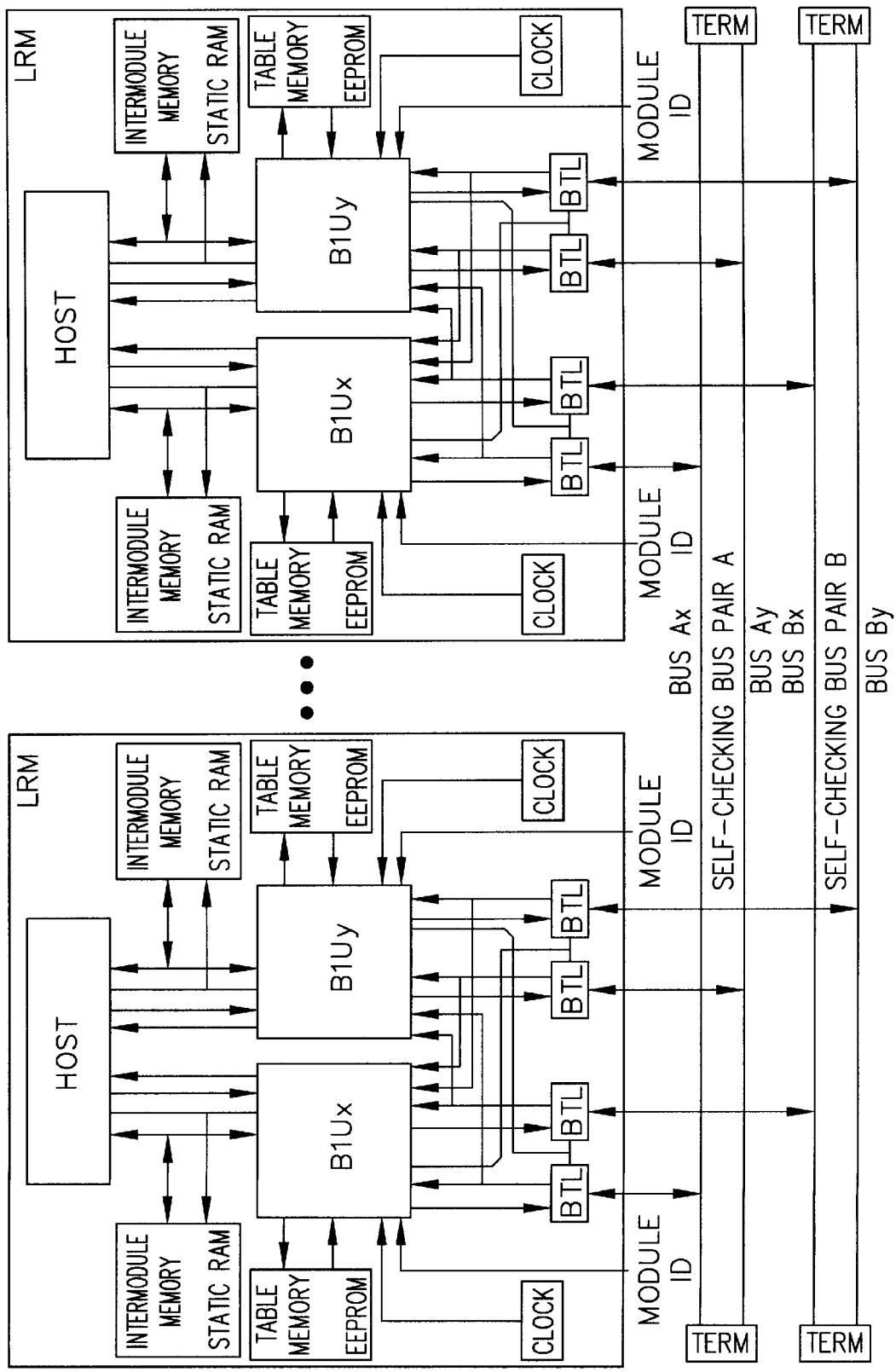
FIG. 1 is the interface logic of the present invention.

The interface logic used in the LRMs, which is illustrated in FIG. 1, is comprised of a Bus Interface Unit Application Specific Integrated Circuit that is in electrical communication with the host, a Table Memory that is in electrical communication with the Bus Interface Unit, an Intermodule Memory that is in electrical communication with the Bus Inte☐☐rface Unit and the host, and a pair of Backplane Transceivers that provides data lines between the Bus Interface Unit and two Self-Checking Bus Pairs Each Bus Interface Unit in the module has an attached clock for timing and synchronization. The narrow transmission data path created by this scheme drastically reduces the total pin count for the LRM, increasing the system's inherent reliability.

In each LRM, the interface logic is paired to provide immediate fault detection and containment and is configured in a unique form of dual-dual redundancy that simultaneously provides high integrity and availability. Receiving circuitry in the transmitting LRM checks the transmission for errors. If a babbling LRM, one that constantly transmits errors, is detected, the errant module removes itself from the line. Having each Bus Interface Unit of an LRM control the other Bus Interface Unit's drivers enforces this removal. If either Bus Interface Unit thinks it should not be transmitting, neither Bus Interface Unit will transmit.

Additionally, the backplane bus has two Self-Checking Busses, generally labeled A and B, that interconnects the various LRMs in or between the cabinets. See FIG. 1. Each Self-Checking Bus is itself composed of two sub-busses, x and y. One of the Bus Interface Units of an LRM transmits data on one of the sub-bus pairs in a Self-Checking Bus pair, for example Ax and Bx, and its partner transmits on the other sub-bus pair, Ay and By. The data on any two Self-Checking Bus pairs that comes from different Bus Interface Units are compared by the receiving LRM. Only bit-for-bit identical data is accepted and written into the Intermodule Memories.

Using two Self-Checking Busses provides immediate error correction for single-Self-Checking Bus transient errors. The present invention is fail operational/fail passive; if one Self-Checking Bus fails, the cabinet remains in operation; if the both fails, the cabinet goes quiet.

Integration of multiple independent functions into a single LRM increases the risk that unwanted interactions among the independent functions residing on the shared hardware will lead to unforeseen failures. In order to successfully implement integrated architecture, an execution environment for each independent function is provided in the integrated cabinet that closely emulates the environment of a discrete LRU. In other words, each independent function in the integrated cabinet "sees" a virtual LRU stand-alone environment. This is accomplished by rigidly partitioning all shared resources in the integrated cabinet. Rigid partitioning ensures that one independent function cannot adversely affect another under any possible operating condition, including the occurrence of faults or design errors in the functions.

Any "arbitration" between functions for the various partitions occurs at design time, not run time. A database of Interface Control Document information is parsed into tables used for each Bus Interface Unit on the bus. These tables are loaded into the Bus Interface Unit's Table Memories using an IEEE 1149.1 test bus.

Strict deterministic control of the partitioning means that the functions must be partitioned both in space and in time. This is achieved by placing all message location and bus-timing information in the table memories.

Memory pre-allocation, or fixed mapping of messages to unique locations in the Intermodule Memory, guarantees space determinism and is protected by hardware based memory protection mechanisms, such as processor memory-management units. The pre-allocation of memory areas prevents contention between the functions for memory space and guarantees that no function can prevent another from obtaining adequate memory space. Since the Intermodule Memory mapping information is loaded into the Bus Interface Unit's Table Memory, it cannot be corrupted by any software or communications errors.

Deterministic control over the partitioning of time means pre-allocated time "windows". The bus time is divided into a set of "windows", each containing a single message ranging from 32 bits to 8192 bits. The message is transmitted synchronously within the window, two bits at a time (two-bit parallel) taking from 16 to 4096 clock periods for transmission. Messages that are to be transmitted or have been received over the backplane are placed in buffers in the Intermodule Memories. This organization permits use of a simple host interface, because the hosts view the backplane bus as a multiport memory.

The various windows are separated by a small, fixed gap time, which has a programmable length to account for different LRM spacings and the total bus length. Two to four clock periods for the inter-message gap is preferred.

Time determinism also guarantees that a function with a variable, or aperiodic, demand for hardware resources never prevents another function from obtaining a specified minimum level of service and, more importantly, that the timing of a function's access to these resources will not be affected by the failure or variable demands of another function. If an integrated system design does not build in time determinism, a function can be certified only after all possible combinations of events, including all possible combinations of failure of all functions, have been considered. Clearly the lack of time determinism drastically increases the cost of certification and software maintenance.

The protocol of the LRM is driven by sequences of commands stored in the Bus Interface Unit's Table Memory. Each individual command corresponds, or maps, to an individual time window capable of containing a message, or data, and indicates whether the Bus Interface Unit should transmit or receive the message during the time assigned to that window. Each command contained in the Table Memory also points to the pre-allocated Intermodule Memory location containing or receiving the data.

The commands are organized into cyclic loops called frames. The length of each frame is determined by the sum of the individual window lengths in a single iteration of the loop. The commands in each Bus Interface Unit's table may be organized into multiple frames. Each different frame controls a repetitive sequence of windows, which has a fixed total period. Under tightly controlled conditions, the Bus Interface Units may switch from using one frame to using another.

The protocol of the present invention includes a mechanism to ensure that only LRMs with compatible tables synchronize with each other for normal operations. In this protocol two types of frames are supported. Un-versioned frames allow LRMs of any version of the present invention to communicate. Such frames always operate with the maximum programmable gap size between messages to allow LRMs from completely separate applications to communicate their version information with each other. After power on, all LRMs enter a standard un-versioned initialization frame in which they transmit their versions to a cabinet software function to determine the correct configuration.

Versioned frames require all LRMs to be at the same versioned level. Frame Change Table Commands are provided to switch between frames. These commands informal all Bus Interface Units of the destination frame's version, or if the frame is un-versioned. The mechanism, which allows Bus Interface Units to regain synchronization, also provides version information. Any Bus Interface Unit operating with a table of a different version drops off the bus of the present invention when a Frame Change or regain of synchronization message tells it that the bus is using a versioned frame different than its own. All normal flight operations are performed in a versioned frame.

Slot location information is brought in to each Bus Interface Unit from a backplane connector to allow the Bus Interface Unit to verify that the table it is using is correct for the LRM's physical location. While each table contains a command for each window on the bus of the present invention, these commands are not bit-for-bit identical. It is essential that a LRM only operate with a table that is specific for the slot into which it is currently inserted.

One of the benefits of the table-driven protocol is extremely high efficiency. Avionics applications typically generate short backplane messages, and most serial protocols perform poorly when messages are □□short. Efficiencies of between 10 percent and 30 percent are typical. The protocol of the present invention, on the other hand, is over 89 percent efficient for a continuous stream of 32-bit messages. Because buffer addresses are kept in tables, they do not need to be transmitted on the bus. The use of transmit and receive commands in the individual tables eliminates the neeto send source or destination LRM addresses. And because transmissions are scheduled, no transmission time is consumed arbitrating between contending Bus Interface Units. Except for the inter-message gap and the occasional synchronization message, nearly all clock periods contain data. Thus a 60 megabit-per-second bus, according to the present invention, has a net throughput higher than 54 megabits per second. The backplane can be narrow rather than the wider parallel configuration of most backplane busses because the protocol is so efficient.

In order to accomplish the above, messages have been designed to support the requirement of high efficiency. Because the protocol is table-driven, messages contain only data and do not include address and control information. There are two data-message types: basic and master/shadow. The basic message structure has been chosen to maximize the efficiency of periodic data transmissions. The master/shadow structure supports data transfers by redundant or aperiodic functions. Each message consists of a string of one to 256 32-bit data words followed by the programmable inter-message gap that ranges between two and nine bit times.

With increasing integration of fast Ethernet into electronic applications there will be instances where the data message needed to be transmitted is longer than 256 32-bit data words. According to the present invention, when this condition occurs, the data messages are parsed into multiple, smaller packets. These smaller packets, packets having lengths less than 256 32-bit data words, are then transmitted over the network to at least one receiver, typically through several adjacent windows in the frame.

The first transmitted packet is written into a higher address of the IMM space allocation for that particular message. It is critical to the invention that subsequent packets are sent in continuing reverse order and written into successively lower positions of the pre-allocated memory space. This is repeated until all packets of the data message have been transmitted and received by the at least one receiver. However, for the transmitted data to be reconstituted into a coherent data message, the appended packet headers must be removed. This is normally done using software.

The present invention reintegrates the packet information without the requirement of software, or even additional hardware. This is accomplished by shifting the message storage space area of a subsequently transmitted and received packets by the length of any packet control information, whether header or trailer, and overwriting the packet control information with a portion of the subsequently transmitted and written packet. For example, since the header of the first packet is written last into the memory area, a portion of the next written packet (shifted) overwrites the header information thereby reintegrating the data message.

Alternately, this method may be utilized to remove packet trailers, but not headers and trailers simultaneously, by reversing the sequencing and ordering of the packets and writing the packets to memory from the lower memory end up.

If desired, the inter-packet time may be utilized by the host to examine the packet header or trailer information for additional packet handling information prior to it being overwritten.

Figure 2:
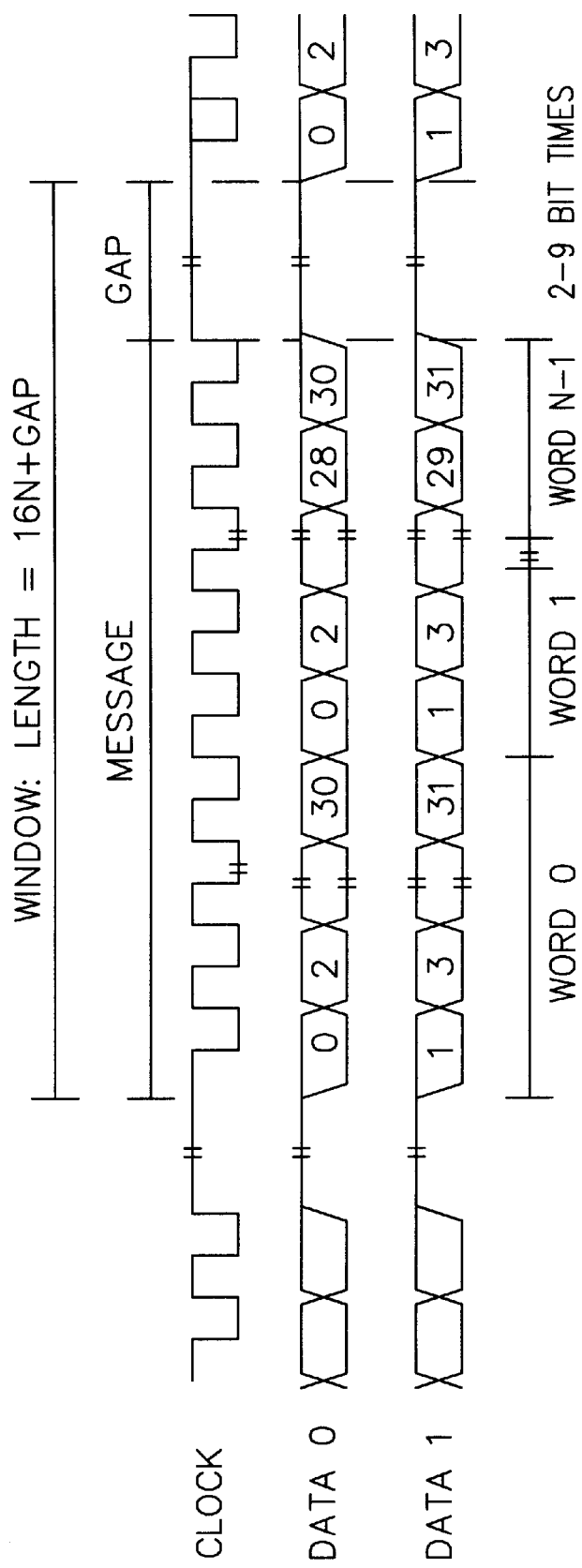
FIG. 2 is the simple structure of basic messages.

Basic messages have a simple structure, which is illustrated in FIG. 2, and are used when there is a single source and single or multiple destinations. The master/shadow mechanism is used when there are multiple alternative sources and single or multiple destinations and allows LRMs or applications to be reconfigured or parsed without disturbing the traffic pattern on the bus.

Figure 3:
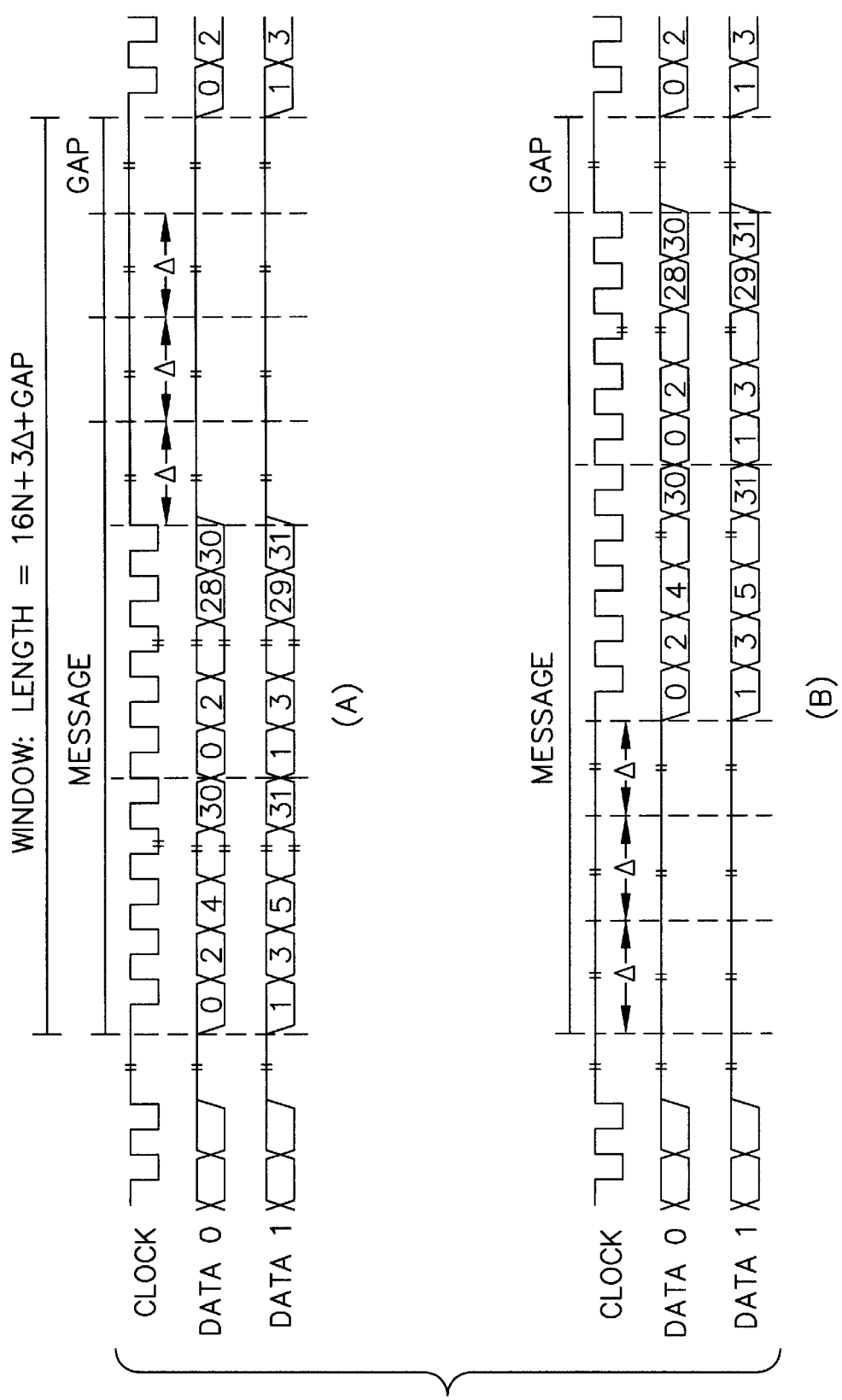
FIG. 3 shows examples of master (a) or third shadow (b) transmissions according to the present invention.

Master/shadow windows are identified by a field in the associated table command. As many as four transmitters can be assigned to one master/shadow window. Time-slot arbitration determines which of the transmitters actually gets control of the window. If the master is alive and has fresh data to send, it starts transmitting at the beginning of the window. The first shadow begins transmitting "delta" bit times into the window, but only if the master did not use its opportunity to transmit. The second shadow begins transmitting two delta bit times into the window, but only if the master and the first shadow did not use their opportunities to transmit. Finally, the third shadow begins transmitting three delta bit times into the window, but only if none of the other candidate transmitters use their opportunities to transmit. Delta is a programmable value that is typically set at one bit time larger than the selected inter-message gap (preferably, values from three to ten bit times are selected). The selected value depends on the propagation characteristics of the backplane. Un-versioned frames use the maximum delta time of ten bit times. Examples of the transmission over the present invention when the master or third shadow transmits are shown in FIG. 3.

The time-slot arbitration of the master/shadow windows could re-introduce non-determinism, but strict measures have been taken to eliminate this danger. First, extra bit times in the window and a restriction on the size of the message guarantee that message transmission will be completed within the assigned time window, no matter what happens during arbitration. Thus, the time window remains the same size no matter which transmitter "wins" the arbitration. Second, recipients of a master/shadow message always place the data in the same pre-allocated memory location, no matter which transmitter wins the arbitration. Third, delta can be made large enough to guarantee that the candidate transmitters will never mistake a busy bus for any idle one and begin transmitting in error.

The various Bus Interface Units are synchronized with each other, so that at any given time all Bus Interface Units are at equivalent points in their respective tables. Synchronization messages have been designed to support the requirements for data integrity and time determinism. Cabinet synchronization is guaranteed in the case of any reasonable failure scenario, and synchronization does not require any centralized resource that could diminish the system's integrity.

Figure 4:
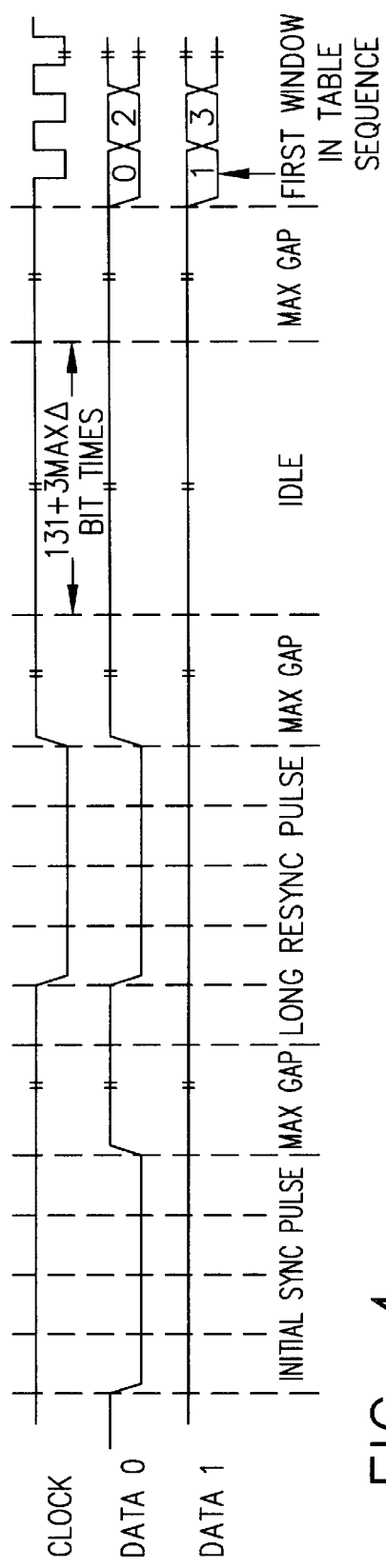
FIG. 4 is an example of an initial synchronization message used at system reset.
Figure 5:
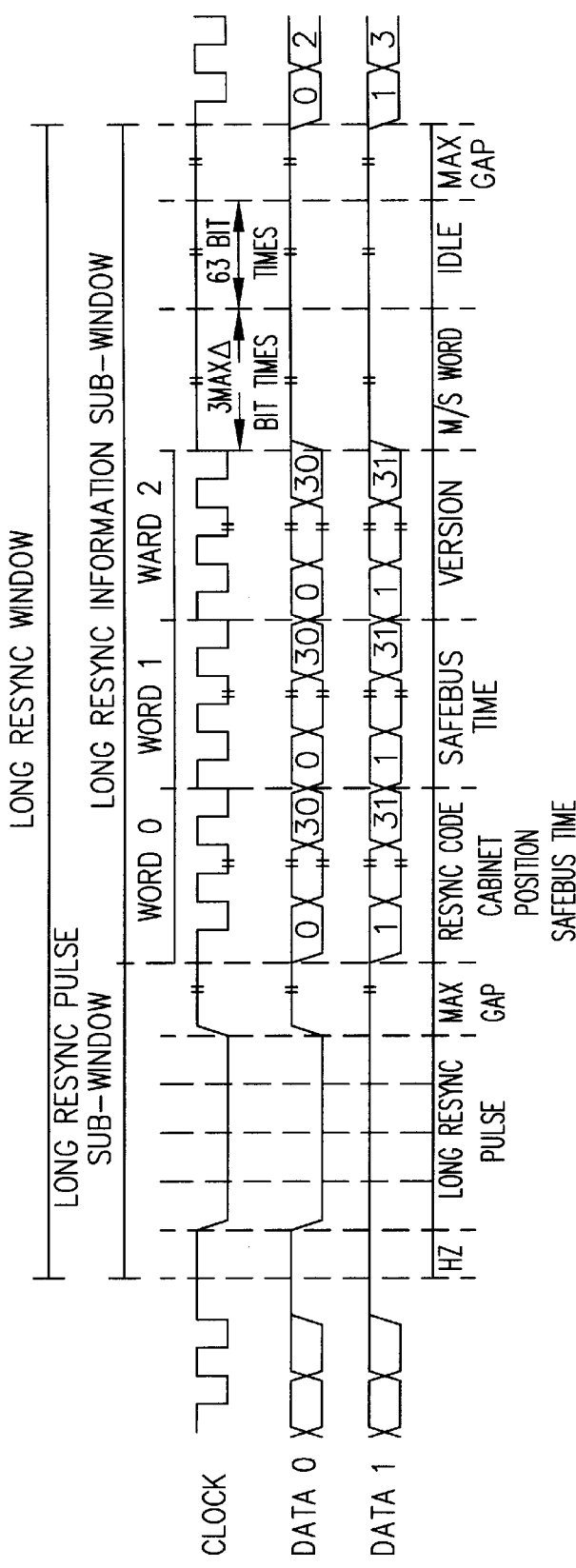
FIG. 5 is an example of a long resynchronization message containing sufficient information to allow a "lost" LRM to regain synchronization with an active bus.
Figure 6:
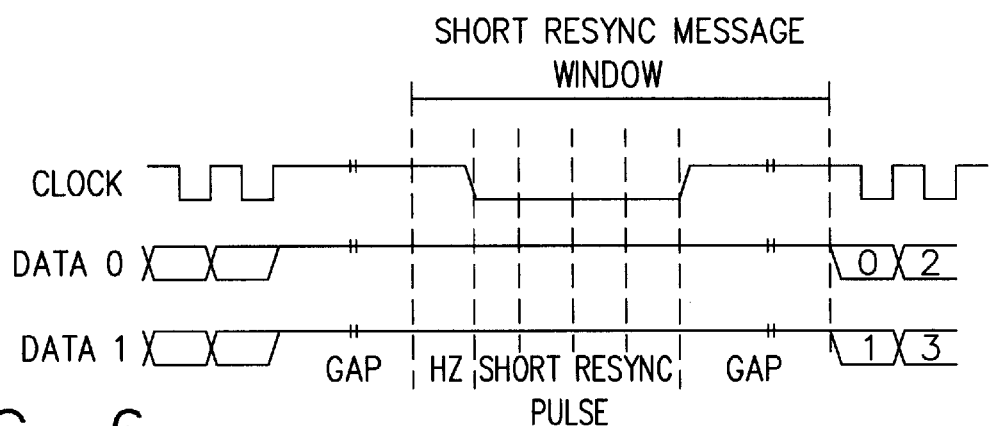
FIG. 6 is an example of a short resynchronization message used to correct for oscillator drift.

Three types of synchronization messages are provided to bring the Bus Interface Units in step under three circumstances: first, an initial synchronization message, which is illustrated in FIG. 4, is used at system reset; second, a long resynchronization message, which is illustrated in FIG. 5, is used when an LRM is "lost" and contains sufficient information to allow the "lost" LRM to regain synchronization with an active bus; and third, a short resynchronization message, which is illustrated in FIG. 6, is used to correct for oscillator drift. The long resynchronization message contains a resynchronization code that allows a "lost" Bus Interface Unit to determine which of 256 locations in its Table Memory it should jump to in order to catch up with the other Bus Interface Unit. To provide additional fault tolerance, all Bus Interface Units transmit the synchro☐ization-pulse portion of every synchronization message. The multiple synchronization pulses are combined into a single pule by an open-collector BTL driver. Further, any LRM can originate an initial synchronization pulse. Since the synchronization mechanism is decentralized, no particular LRM must be operational to start up the backplane or to maintain synchronization.

After any synchronization message is received, all Bus Interface Units should be tightly synchronized, preferably to within one bit time. Since oscillators eventually drift, however, the inter-message gap may close up. Therefore, the short resynchronization messages are programmed into the command tables with enough frequency to prevent significant gap closure.

Each Bus Interface Unit maintains a counter driven by its synchronization-corrected oscillator. The synchronization mechanisms make the values in these counters identical for all Bus Interface Units. This time value may be used to time stamp data.

To make the system even more predictable, the execution of the software in the processing LRMs is synchronized with the execution of the commands in the use table. Thus, the applications software is at the same point during the same bus transmission window in every frame. One benefit is that message latencies are reduced; results can be scheduled to be transmitted just after they are generated, and data can be brought in from the In/Out lines of the LRMs just before it is needed. A second benefit is that there is less latency jitter on cabinet outputs, which means that the Integrated Modular Avionics System can be used in tighter control loops. A third benefit is that double buffering is rarely necessary because it is possible to schedule the transmission of a data block for a time when it is known the function software will not be accessing it or modifying it. The elimination of double buffers means the Intersmodule memories can be smaller and memory access faster.

Figure 7:
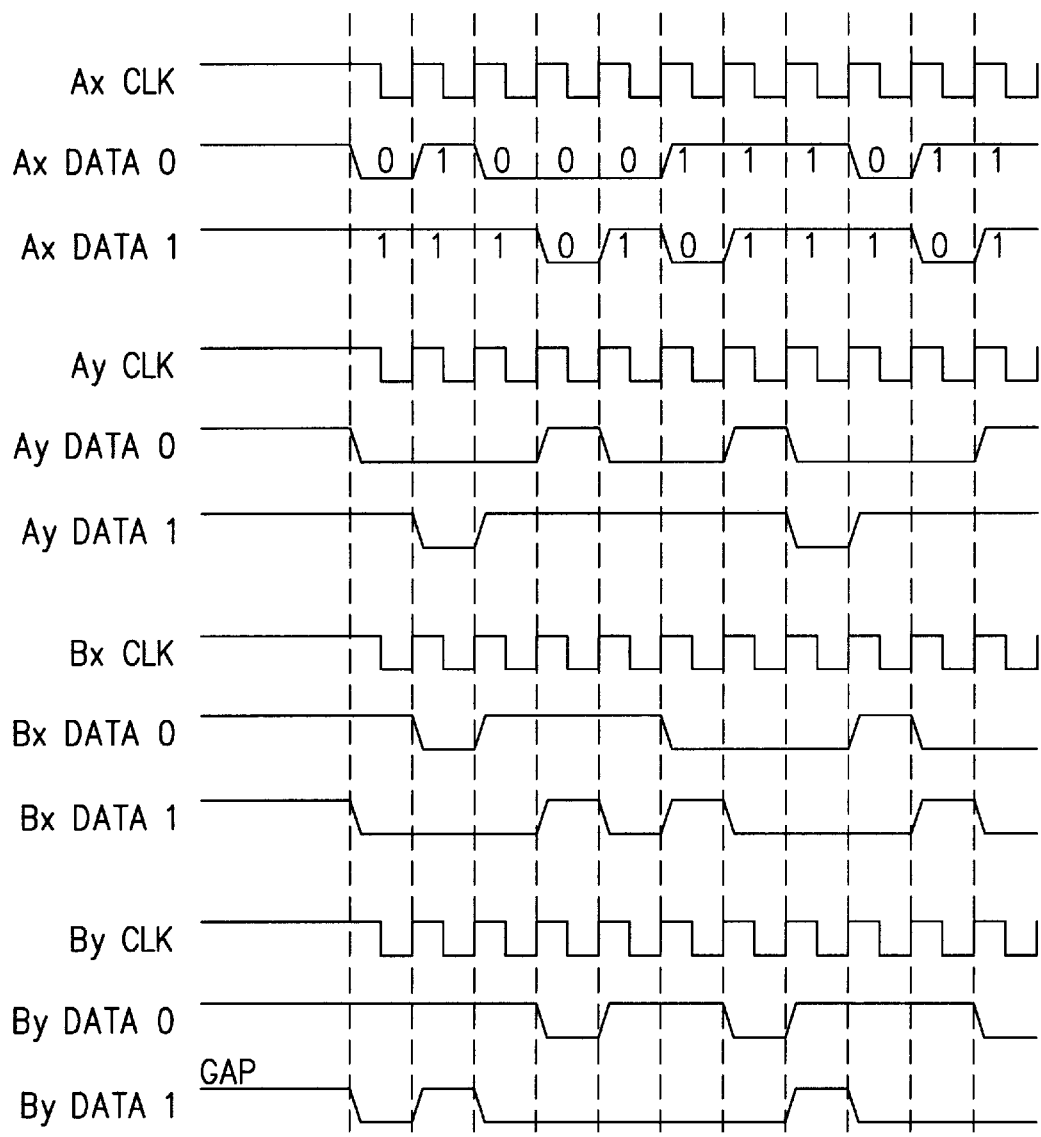
FIG. 7 is an example of the encoding of data for improved error-detection according to the present invention.

To improve error-detection coverage, data on the four serial lines used☐in the two Self-Checking Bus pairs are encoded in four different ways, which is illustrated in FIG. 7: the data on bus Ax has normal polarity; the data on bus Bx is inverted; for the data on bus Ay, every other bit is toggled, starting with the second bit; and the data for bus By is the inverse of bus Ay.

This encoding scheme allows bus shorts or transient upsets that affect several data lines simultaneously to be detected. It also allows quick detection of bus collisions caused by malfunctioning Bus Interface Units. Because bus lines are "wired OR," if a Bus Interface Unit-pair malfunctions and tries to transmit at the same time as another Bus Interface Unit-pair, illegal encodings appear as soon as the Bus Interface Unit-pairs transmit differing data. An additional virtue of this encoding scheme is that power consumption is independent of the data being transmitted. Two bus lines are always high and two are always low; when the data change, two of the buses change state and two do not. Because power consumption is constant the power supply does not have to be designed for a worst-case data pattern.

It should be understood that the foregoing specific components illustrated and described in the specification are not to be interpreted as limiting the scope of the invention. The breadth and depth of the overall inventive concept are deemed to be limited only by the following appended claims.

What is claimed is:

1. A method for transmitting large information messages over a network comprising the steps of:
  a. identifying a large information message to be transmitted over a network;
  b. partitioning the large information message into at least first and last packets;
  c. attaching additional packet control information to the partitioned packet;
  d. transmitting the last packet over the network to at least one receiver;
  e. Writing the received first transmitted packet into a memory location;
  f. transmitting over the network to the at least one receiver followed by writing received subsequent packets in reverse order; the subsequently transmitted and written packets being written into memory locations adjacent to the previously transmitted and written packets, said subsequently transmitted and written packets shifted in memory location such that the attached packet control information of the previously transmitted and written packet is overwritten by a portion of the subsequently transmitted and written packet;
  whereby the steps of transmitting and writing of the packets is repeated until the partitioned large information message is reintegrated into a coherent, contiguous message.

2. The method as in claim 1 wherein the step of attaching additional packet control information to the partitioned packet is performed by a transmitter.

3. The method as in claim 2 wherein the packets are transmitted with an inter-message time that is large enough for the packet control information to be read by a receiver.

4. The method as in claim 1 wherein the step of attaching additional packet control information to the partitioned packet is performed by a receiver.

5. The method as in claim 4 wherein the packets are transmitted with an inter-message time that is large enough for the packet control information to be read by a receiver.

6. A method for removing packet header information comprising the steps of:
  a. transmitting a first packet over a network to at least one receiver; followed by
  b. Writing the received first transmitted packet onto a memory location; followed by
  c. transmitting a subsequent packet over the network to the at least one receiver; followed by
  d. Writing the subsequently received transmitted packet onto memory locations adjacent to the previously written packet, said subsequently written packet shifted in memory such that the packet header information of the previously written packet is overwritten by a last portion of the subsequently written packet,
  whereby the said steps of transmitting and writing of a subsequent packet is repeated until all the packet header information that is desired to be removed has been removed and the data message information is stored in the memory locations.

7. A method for removing packet trailer information comprising the steps of:

a. transmitting a first packet over a network to at least one receiver; followed by
b. Writing the received first transmitted packet onto a memory location; followed by
c. transmitting a subsequent packet over the network to the at least one receiver; followed by
d. writing the subsequently received transmitted packet onto memory locations adjacent to the previously written packet, said subsequently written packet shifted in memory such that the packet trailer information of the previously written packet is overwritten by a first portion of the subsequently written packet, whereby the said steps of transmitting and writing of a subsequent packet is repeated until all the packet trailer information that is desired to be removed has been removed and the data message information is stored in the memory locations.

* * * * *